US008657930B2

(12) United States Patent
Betting et al.

(10) Patent No.: US 8,657,930 B2
(45) Date of Patent: Feb. 25, 2014

(54) SEPARATION SYSTEM COMPRISING A SWIRL VALVE

(75) Inventors: Marco Betting, Rijswijk (NL); Cornelis Antonie Tjeenk Willink, Rijswijk (NL)

(73) Assignee: Twister B.V. (NL)

( * ) Notice: Subject to any disclaimer, the term of this patent is extended or adjusted under 35 U.S.C. 154(b) by 84 days.

(21) Appl. No.: 13/263,703

(22) PCT Filed: Apr. 7, 2009

(86) PCT No.: PCT/NL2009/050181
§ 371 (c)(1),
(2), (4) Date: Dec. 8, 2011

(87) PCT Pub. No.: WO2010/117259
PCT Pub. Date: Oct. 14, 2010

(65) Prior Publication Data
US 2012/0090467 A1    Apr. 19, 2012

(51) Int. Cl.
*B01D 45/12*    (2006.01)

(52) U.S. Cl.
USPC .......... 95/269; 95/149; 95/29; 95/34; 95/243; 95/32; 95/259; 55/394; 55/396; 55/457; 55/447; 96/389; 96/355; 96/360

(58) Field of Classification Search
USPC ........ 55/394, 396, 457, 447; 95/269, 149, 29, 95/34, 243, 32, 259; 96/389, 355, 360; 62/5, 620, 621, 637, 116, 910, 500; 202/182
See application file for complete search history.

(56) References Cited

U.S. PATENT DOCUMENTS

| 6,280,502 B1 | 8/2001 | van Veen et al. |
| 6,730,236 B2 * | 5/2004 | Kouba ........................... 210/806 |
| 2003/0145724 A1 | 8/2003 | Betting et al. |
| 2009/0031756 A1 * | 2/2009 | Betting et al. .................. 62/620 |

FOREIGN PATENT DOCUMENTS

| EP | 1 974 790 | 10/2008 |
| WO | 2006/070020 | 7/2006 |
| WO | 2006/089948 | 8/2006 |
| WO | 2009/002174 | 12/2008 |

* cited by examiner

*Primary Examiner* — Dung H Bui
(74) *Attorney, Agent, or Firm* — Meyer IP Law Group

(57) ABSTRACT

The invention relates to a separation system comprising a flow inlet (16). The separation system comprises a swirl valve (100), arranged to receive and control the flux of a fluid flow via the flow inlet (16) and to generate a swirling flow, swirling about a central axis (11). The separation system further comprises a separation chamber (40) positioned downstream with respect of the swirl valve (100) to receive the swirling flow from the swirl valve (100), wherein the separation chamber (40) comprises a first and second flow outlet (41, 42). The first flow outlet (41) is positioned to receive an inner portion of the swirling flow and the second outlet (42) is positioned to receive an outer portion of the swirling flow.

27 Claims, 9 Drawing Sheets

SEPARATION SYSTEM COMPRISING A SWIRL VALVE

TECHNICAL FIELD

The invention relates to a separation system comprising a swirl valve, a processing system comprising such a separation system, a method to separate a fluid flow, and a method for processing a fluid.

STATE OF THE ART

In the oil and gas industry control valves are used to control pressure, level, temperature and flow. In some cases these control valves operate at choked conditions, once sufficient pressure drop is created over the control valve. In processing natural gas this pressure reduction over a valve causes the temperature to drop without extracting heat or work from the gas. This so called isenthalpic expansion process is also known as Joule-Thompson (JT) cooling. The valve creating this pressure reduction is called a JT valve. The cooling effect over a JT valve is used to condense a part of the natural gas stream, such that the liquefied fraction can be separated in a vessel. For the majority of these separator vessels the driving force is either inertia or gravity forces or in other words the masses of the liquefied drops determine the efficiency of the separation. Such a Low Temperature Separator preceded by a JT valve is normally referred to as a JT-LTS system.

Even though the prime function of a JT valve is flow rate control, it is often forgotten that the second function is to create a separable liquid phase. In the gas processing industry the mean droplet size resulting from an isenthalpic expansion over a JT valve is unknown, hence the separation efficiency of downstream phase separators is to a large extent unknown. From time to time gas quality problems do occur due to a suboptimal separation efficiency. In those cases it is often the hydrocarbon dew point which remains too high, which indicates that especially hydrocarbon droplets tend to be too small.

According to the prior art, JT valves are known that can be used to control a flow rate, but which at the same is designed to create a liquid phase that can be separated relatively easy.

International patent application WO2006/070020A1 describes a throttling valve having a housing, a valve body which is movably arranged in the housing to control the flux of a fluid stream flowing from a fluid inlet channel into a fluid outlet channel of the valve such that the fluid stream is expanded and cooled. Also provided are swirl imparting means which impose a swirling motion to the fluid stream flowing through the fluid outlet channel. The swirl imparting means are oriented such that the fluid stream swirls about a longitudinal axis of the fluid outlet channel thereby inducing liquid droplets to swirl towards the outer periphery of the fluid outlet channel and to coalesce. By doing this, the size of the liquid droplets that flow through the fluid outlet channel are relatively large, enabling a more efficient separation process. A more detailed explanation of WO2006/07002A1 will be provided below with reference to FIGS. 1a and 1b.

A similar valve is provided by WO2007/024138A1 filed in the name of Typhonix AS. WO2007/024138A1 describes a control valve which aims to maximize the liquid droplet size exiting the valve.

WO2006/070020A1 provides a swirl valve which enlarges the droplet size by providing a swirling motion to the flow as to improve the overall separation efficiency. The valve may also be referred to as a pressure let-down valve (such as used in JT-LTS systems).

Large and expensive phase separators may be required downstream of such a swirl valve to obtain sufficient separation.

Although the examples provided in this text are mainly about separation of liquid droplets from gas flows (droplet dispersion in gas flows), one can apply the provided embodiments to enlarge bubble dispersion in liquid flows or to enlarge the droplet dispersion in liquid flows. So, dispersed multiphase flows may include:

Liquid droplets (dispersed phase) in a gaseous carrier (continuous phase),

Gas bubbles (dispersed phase) in a liquid carrier (continuous phase),

Liquid droplets (dispersed phase) in an (immiscible) liquid carrier (continuous phase).

First an example of a swirl valve design, as already disclosed in WO2006/070020 is described in more detail.

Enlarging the Mean Diameter of the Dispersed Phase

Regarding pressure let-down valves (such as JT valves) droplets can be formed through 3 basic mechanisms:
1. break-up of stratified phases through interfacial shear,
2. nucleation/cavitation from continuous phases (resp. condensing gas/evaporating liquid),
3. coalescence of droplets into larger droplets and even to stratified phases.

For the first two mechanisms the interfacial tension is a dominant property. The lower the interfacial tension the smaller the droplets/bubbles resulting from a droplet or bubble formation process.

The third mechanism (coalescence) is proportional to the collision rate between droplets, which depends on: a) droplet number density, b) turbulence intensity, c) relative droplet speed.

Figure 1A:
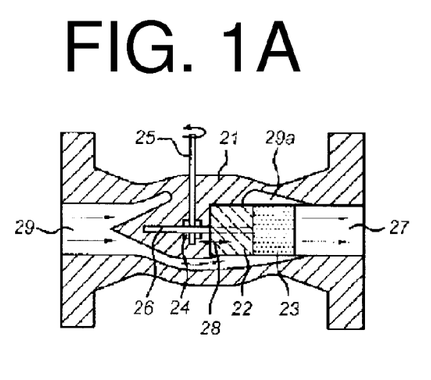
FIGS. 1a, 1b, 2a and 2b schematically depict valves according to the prior art.

FIG. 1a schematically depicts a traditional (non-swirl) cage-valve for flow control service as supplied by Mokveld Valves B.V. in which the flux of fluid is throttled over a perforated sleeve or cage 23, which is connected to a piston-type valve body 22.

The conventional Mokveld throttling valve shown in FIG. 1a comprises a valve housing 21 in which a piston-type valve body 22 is slideably arranged in the associated perforated sleeve 23 such that by rotation of a gear wheel 24 at a valve shaft 25 a teethed piston rod 26 pushes the piston type valve body 22 up and down into a fluid outlet channel 27 as illustrated by arrow 28. The valve has an fluid inlet channel 29 which has an annular downstream section 29A that may surround the piston 22 and/or perforated sleeve 23 and the flux of fluid which is permitted to flow from the fluid inlet channel 29 into the fluid outlet channel 27 is controlled by the axial position of the piston-type valve body 22 in relation to the associated perforated sleeve 23.

The conventional sleeve 23 comprises perforations 30—slots or holes—that have a radial orientation i.e. rectangular to the cylindrical surface of the sleeve 23. This is shown in FIG. 1b providing a cross sectional view of the cage 23 of FIG. 1a.

By displacing the piston 22 in the sleeve 23 in axial direction the flow area can be controlled.

Figure 1B:
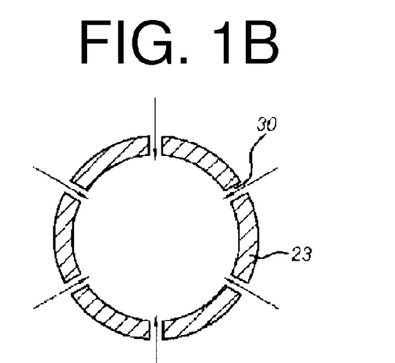

This valve according to FIGS. 1a and 1b can be improved by using the available free pressure for isenthalpic expansion to create a swirling flow imposed by a specific geometry of the valve trim and/or valve stem. The kinetic energy is then mainly dissipated through dampening of the vortex along an extended pipe length downstream the valve.

The advantage of creating a swirling flow in the valve is twofold:
1. Regular velocity pattern→less interfacial shear→less droplet break-up→larger drops, and
2. Concentration of droplets in the circumference of the flow area→large number density→improved coalescence→larger drops.

These advantages are explained in more detail below with reference to FIGS. 3a-b and 4a-b, qualitatively showing the difference in flow pattern and droplet density distribution.

Although any pressure let-down valve would be suitable to create a swirling flow, in the examples provided a cage-type valve as supplied by Mokveld is discussed.

According to an improved valve, the flow is throttled over a perforated cylinder (cage). In FIG. 1b these perforations—slots or holes—have a radial orientation i.e. rectangular to the cylinder surface. By displacing the piston in axial direction the flow area can be controlled, as shown in FIG. 1a.

Figure 2A:
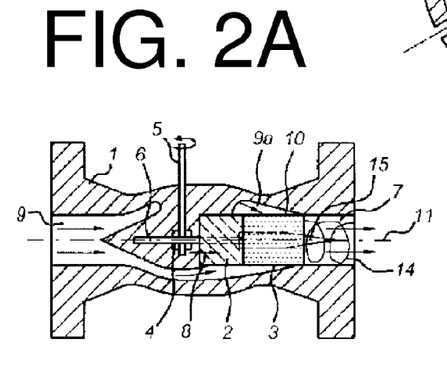

The swirl valve shown in FIG. 2a comprises a valve housing 1 in which a piston-type valve body 2 in the associated perforated sleeve or cage 3 is slideably arranged such that by rotation of a gear wheel 4 at a valve shaft 5 a teethed piston rod 6 pushes the piston type valve body up and down into a fluid outlet channel 7 as illustrated by arrow 8. The valve has an fluid inlet channel 9 which has an annular downstream section 9A that may surround the piston 2 and/or perforated sleeve 3 and the flux of fluid which is permitted to flow from the fluid inlet channel 9 into the fluid outlet channel 7 is controlled by the axial position of the piston-type valve body 2 relative to the associated perforated sleeve 3. The valve may furthermore comprise a conical central body 15 which is substantially co-axial to a central axis 11 of the fluid outlet channel 7 and which generates an outlet channel 7 having a gradually increasing cross-sectional area in downstream direction, thereby generating a controlled deceleration of the fluid flux in the outlet channel 7 and a vortex with a swirl factor that promotes growth and coalescence of condensed fluid droplets.

Figure 2B:
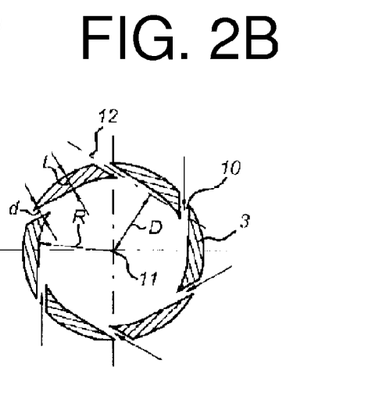

FIG. 2b illustrates that in the swirl valve the perforated sleeve 3 comprises tilted or non-radial perforations 10, that are drilled in a selected partially tangential orientation relative to a central axis 11 of the fluid outlet channel 7 such that the longitudinal axis 12 of each of the perforations 10 crosses the central axis 11 at a distance D, which is between 0.2 and 1, preferably between 0.5 and 0.99 times the internal radius R of the sleeve 3.

The tilted perforations 10 create a swirling flow in the fluid stream flowing through the fluid outlet channel 7 as illustrated by arrow 14. The swirling motion may also be imposed by a specific geometry of the valve trim and/or valve stem. In the valve according to FIGS. 2a and 2b the available free pressure is used for adiabatic expansion to create a swirling flow in the fluid stream. Since no thermodynamic work is exerted on, or delivered by the expanding fluid with respect to its surroundings, said adiabatic expansion is close to an isenthalpic process. The kinetic energy is mainly dissipated through dampening of the vortex along an extended pipe length downstream the valve.

Although any Joule-Thomson or other choke and/or throttling type valve could be suitable to create a swirling flow, the examples provided use a choke-type throttling valve as supplied by Mokveld Valves B.V. and disclosed in their International patent application WO2004083691.

According to FIGS. 2a and 2b, the slots or holes in the cage are shaped in tangential direction such that the flow starts swirling after passing the cage. This has an effect on the flow pattern created downstream of the cage, as qualitatively shown in FIGS. 4a and 4b.

Figure 3A:
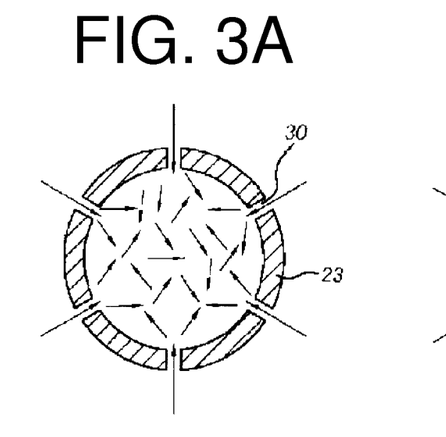
FIGS. 3a, 3b, 4a and 4b schematically depict flow patterns and a density distributions of droplets according to the prior art, FIGS. 5a-5e schematically depict different embodiments, FIGS. 6a and 6b schematically depict further embodiments comprising an injection device, FIGS. 7a-c schematically depict embodiments of a gas processing system, FIGS. 8A-8E schematically depict embodiments of an oil processing system.
Figure 3B:
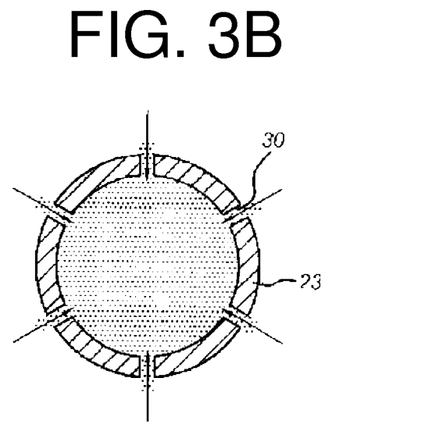
Figure 4A:
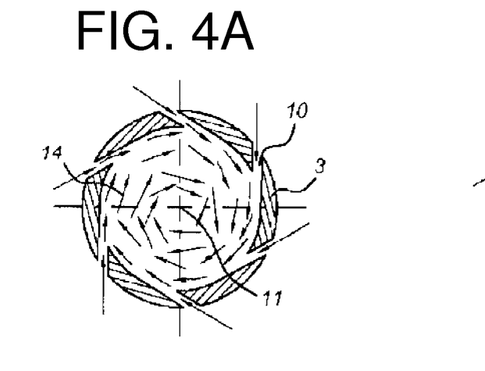
Figure 4B:
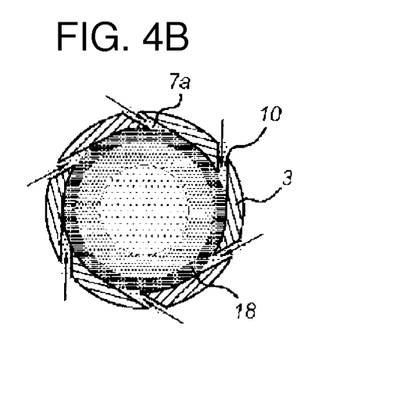

FIGS. 3a and 3b schematically depict a flow pattern and a density distribution of droplets respectively, corresponding to the traditional valve as for instance shown in FIGS. 1a and 1b. A flow pattern and a density distribution of droplets corresponding to the swirl valve as for instance shown in FIGS. 2a and 2b, is schematically depicted in FIGS. 4a and 4b respectively.

The flow pattern in a cage valve with radial openings is highly disordered, as shown in FIG. 3a, hence introducing high shear forces causing droplets to break up into smaller droplets. In a swirl valve with tangential openings a more regular swirl pattern establishes introducing less shear force, resulting in less droplet break up, as can be seen in FIG. 4a.

Furthermore, the swirling fluid flow as created in a swirl valve forces the droplets to move to the outer circumference of the flow area where they easily agglomerate to larger droplets. This is shown by FIGS. 3b and 4b, showing the density distributions of droplets of a valve according to FIGS. 1a and 2a respectively, where darker shadings indicate a higher droplet density.

In general, valves in which a swirling motion is provided to the fluid flow flowing through there will be referred to as swirl valves. Downstream of such swirl valves further phase separators may be provided to separate the liquid droplets. In many cases a number of phase separators (separator trains) are required. This is disadvantageous, as it makes the prior art solutions relatively voluminous, heavy and thereby not very cost effective.

Such swirling valves and further phase separators may be used on fluid streams which evolve at high pressure such as well fluids from subterranean reservoirs (e.g. oil and gas). In more general terms the fluids under consideration mainly comprise hydrocarbon gases and liquids or mixtures whether or not diluted with an aqueous fluid (e.g. water). During the processing of said well fluids the pressure is reduced in a controlled way for instance to cool the fluid (gas) or to evaporate the volatile fluid components (oil). Especially for the latter process the pressure reduction goes down to atmospheric pressure to obtain a stabilized liquid, whereas for gas processing the pressure reduction is only partial in order to restore sufficient mass-density to economically transport the gas through a pipeline. After all these pressure reduction stages, phase separators may be applied to split:

Liquids from gas (e.g. water & condensate from gas),
Gases from liquid (e.g. gas from oil),
Liquid from liquids (e.g. oil from water or water from oil).

Short Description

It is an objective to provide a more compact separation system and processing system comprising a swirl valve.

According to an aspect there is provided a system comprising a flow inlet, wherein the separation system comprises a swirl valve, arranged to receive and control the flux of a fluid flow via the flow inlet and to generate a swirling flow, swirling about a central axis, wherein the separation system further comprises a separation chamber positioned downstream with respect of the swirl valve to receive the swirling flow from the swirl valve, wherein the separation chamber comprises a first and second flow outlet, wherein the first flow outlet is positioned to receive an inner portion of the swirling flow and the second outlet is positioned to receive an outer portion of the swirling flow. Providing such a system allows establishing substantial cost savings especially on offshore platforms.

According to a further aspect there is provided a processing system, for processing a fluid, the processing system comprising at least one separation system according to the above.

According to a further aspect there is provided a method to separate a fluid flow, the method comprises:
receiving a fluid flow in a swirl valve, thereby generating a swirling flow, swirling about a central axis,
separating an inner portion of the swirling flow from an outer portion from the swirling flow in a separation chamber, the separation chamber comprising first flow outlet and a second flow outlet, arranged to receive the inner portion and the outer portion respectively.

SHORT DESCRIPTION OF THE DRAWINGS

Embodiments will now be described, by way of example only, with reference to the accompanying schematic drawings in which corresponding reference symbols indicate corresponding parts, and in which.

DETAILED DESCRIPTION OF EMBODIMENTS

The embodiments described here provide an improved separation apparatus and separation process.

Figure 5A:
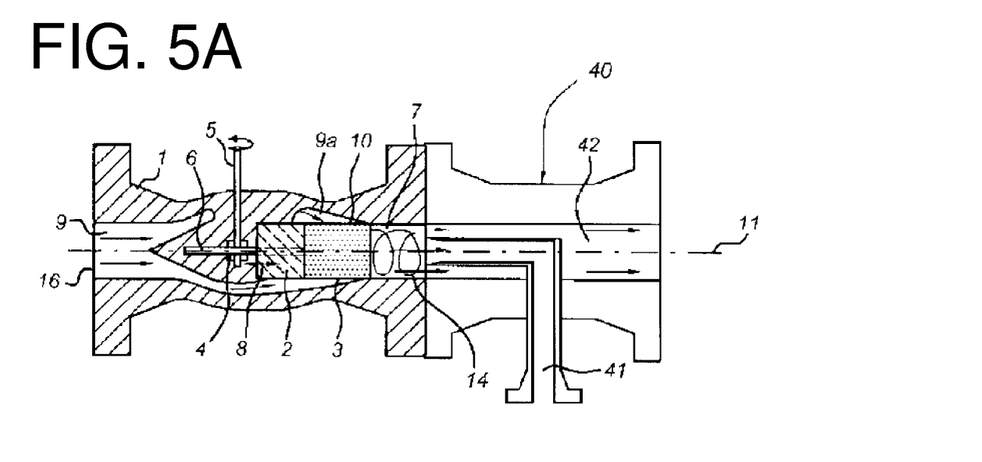

As shown in FIG. 5a, according to an embodiment there is provided a separation system comprising a flow inlet 16, wherein the separation system comprises a swirl valve 100, arranged to receive and control the flux of a fluid flow via the flow inlet 16 and to generate a swirling flow, swirling about a central axis 11, wherein the separation system further comprises a separation chamber 40 positioned downstream with respect of the swirl valve 100 to receive the swirling flow from the swirl valve 100, wherein the separation chamber 40 comprises a first and second flow outlet 41, 42, wherein the first flow outlet 41 is positioned to receive an inner portion of the swirling flow and the second outlet 42 is positioned to receive an outer portion of the swirling flow.

The swirl valve 100 may be as shown in FIGS. 2a and 2b. The swirl valve 100 uses the available free pressure in the fluid flow to create a swirling motion. The swirl valve 100 can also be arranged to control on or more of pressure, level or flow.

By positioning the first and second flow outlets 41, 42 concentrically with respect to each other, the first flow outlet 41 receives a relatively light portion of the swirling flow, while the second flow outlet 42 receives a relatively heavy portion of the swirling flow, since the heavier portions will be forced to the outer periphery as a result of the swirling motion.

The first flow outlet 41 and the second flow outlet 42 may both be formed by a first duct 43 and a second duct 44 respectively, where the first duct 43 has a diameter smaller than the diameter of the second duct 44. Both the first and second tube 43, 44 may be positioned concentrically with respect to the central axis 11, thereby forming the first flow outlet 41 and the second flow outlet 42. FIG. 5d schematically depicts a cross sectional view of the first and second flow outlets 41, 42 (see arrows Vd in FIGS. 5b and 5c). FIG. 5d further shows the fluid bulk density, where darker shadings indicate a denser fluid.

So, according to an embodiment, the first flow outlet 41 is positioned concentrically within the second flow outlet 42 with respect to the central axis 11.

It is noted that the separation chamber 40 is arranged to separate a two-phase fluid flow into a light and a heavy portion. The term two-phase is used to indicate a flow comprising at least two components having different densities, such that separation occurs in a swirling flow. The two phases may be liquid-liquid, gas-liquid, solid-liquid, or gas-solid. Also, as will be explained in more detail below, the two phases may be present in the fluid flow as received at the flow inlet 16, may be generated at or downstream of the swirl valve 100 or may be introduced by means of injection downstream of the swirl valve (as will be described in more detail further below) or a combination thereof. Generation of a new phase at or downstream of the swirl valve 100 may be the result of expansion and cooling of the fluid in the swirl valve 100 as a result of which liquid droplets may be formed by condensation. Of course, the term two-phase also covers flows comprising more than two components having different densities.

The heavy portion of the flow may comprise the hydrocarbon liquid when the light portion of the flow may be gas. Alternatively, the heavy portion of the flow may comprise water, when the light portion of the flow may be hydrocarbon liquid.

In case the separation involves removing liquids from gas (such as in JT-LTS systems) the light portion of the flow may be the product stream which needs no further treatment and the heavy portion of the flow may comprise liquids (such as water/glycol/hydrocarbons) and an entrained gas fraction, which require further treatment in a (reduced size) separator arrangement.

In case the separation process involves removing gases from a liquid (such as in oil stabilization trains) the heavy portion of the flow may be the product stream which needs no further treatment and the light portion of the flow may comprise gases (such as natural gas with liquid carry-over) which requires further treatment in a reduced separator arrangement. Alternatively, this may also be the other way around as described in the paragraph above.

In case the separation involves removing one liquid form another immiscible liquid (e.g. water from an oil) the light portion of the flow (i.e. oil) may be the product stream which needs no further treatment and the heavy portion of the flow may comprise the aqueous phase (e.g. water, glycol etc) and an entrained oil fraction, which requires further treatment in a reduced separator arrangement.

Figure 5B:
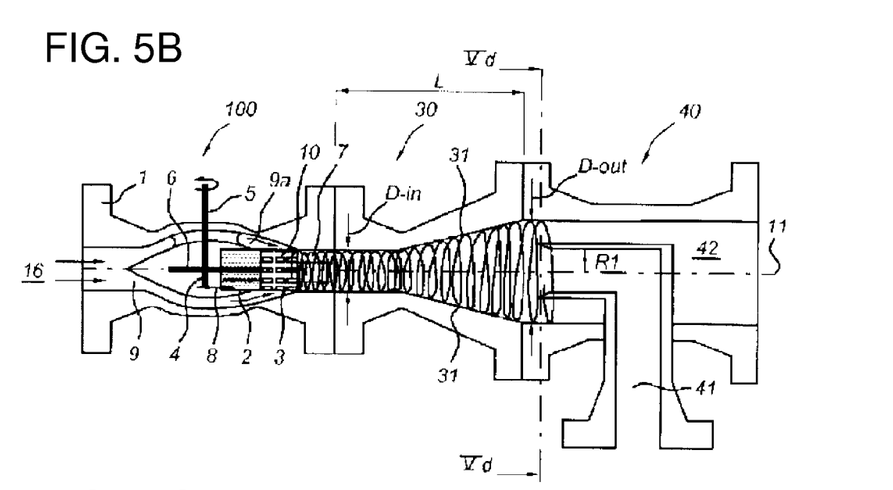

According to a further embodiment schematically depicted in FIG. 5b, there is provided similar separation system as shown in FIG. 5a, but now further comprising a settling chamber 30 positioned in between the swirl valve 100 and the separation chamber 40, to receive the swirling flow from the swirl valve 100, the settling chamber 30 may be divergent in a downstream direction along the central axis 11 to create a diverged swirling flow, and deliver the diverged swirling flow to the separation chamber 40.

The settling chamber 30 may be provided to improve the separation efficiency by allowing the swirling motion to force the heavier components to the outer periphery and the lighter components to the centre.

The settling chamber 30 may be formed by a wall 31 that is axis symmetrical (with respect to the central axis 11) and may for instance be a conical shape or a cylinder shape.

The length L (as indicated in FIG. 5b) of the settling chamber 30 is determined with the required time period for droplets to migrate in radial outward direction when exposed to the centrifugal force of the rotating fluid. The length L of the settling chamber 30 may for instance be chosen such that >99.5% of the droplet mass has reached a radial position equal to or larger than an outer radius R1 of the first duct 43 of the first flow outlet 41, such that they flow into the second duct 44 of the second flow outlet 42.

Alternatively, when dealing with a bubbly flow said length L is chosen such that >99.5% of the bubble mass has reached a radial position equal to or smaller than inner radius R1 of the first duct 43 of the first flow outlet 41, such that they flow into the first duct 43 of the first flow outlet 41.

Depending on the feed conditions, the length L of the settling chamber 30 may be as small as 1 inlet diameter D-in of the settling chamber 30 up to 50 inlet diameters. The outlet diameter D-out of settling chamber 30 may vary typically from 1 times the inlet diameter D-in up to 4 times the inlet diameter D-in of settling chamber 30.

So, it will be understood that the settling chamber 30, although depicted in the drawings as a divergent settling chamber 30, may also be non-divergent/cylindrical.

The settling chamber 30 thereby generates a controlled deceleration of the swirling flow delivered by the swirl valve 100 and a vortex with a swirl factor that promotes growth and coalescence of condensed fluid droplets.

Figure 5C:
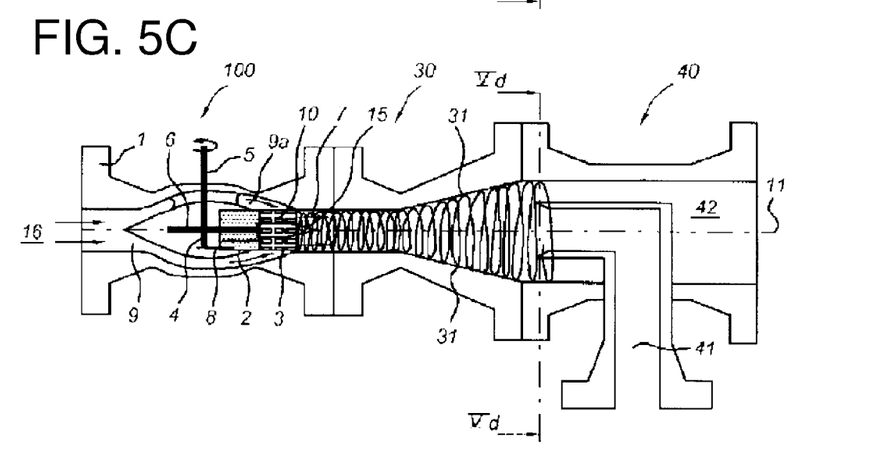
Figure 5D:
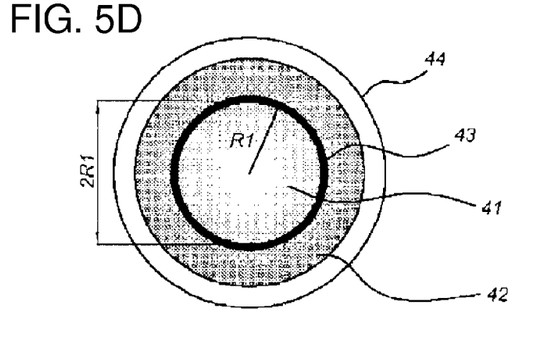

According to FIG. 5c, there is provided an embodiment, further comprising a conical central body 15 which is substantially co-axial positioned along the central axis 11 in the swirl valve 100, having a gradually increasing cross-sectional area in an upstream direction. The conical central body 15 thereby generates a controlled deceleration of the fluid flux in the outlet channel and a vortex with a swirl factor that promotes growth and coalescence of droplets or bubbles. Of course, the conical central body 15 and the settling chamber 30 may be used in combination with each other. The conical central body 15 may be attached to the piston-type valve body 2.

It will be understood that the conical central body 15 may also be used in the embodiment shown in FIG. 5a.

Figure 5E:
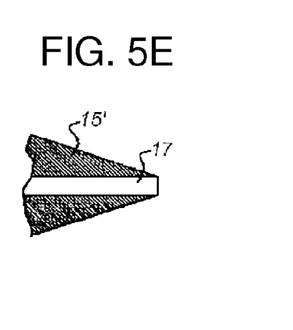

The conical central body 15 may extend in a downstream direction into the settling chamber 30 or separation chamber 40. Instead of comprising a sharp extremity pointing in a downstream direction, as shown in FIG. 5c, the conical central body 15 may comprise a central outlet 17 via which a flow may be introduced as central flow in a downstream direction. Such an alternative conical central body 15' is schematically shown in FIG. 5e.

According to an embodiment, the swirl valve 100 is as described above with reference to FIGS. 2a and 2b, wherein the swirl valve 100 is a throttling valve comprising a housing 1, a valve body 2 which is movably arranged in the housing 1 to control the flux of a fluid flow flowing through the fluid inlet 16 such that the fluid flow is expanded and cooled, and swirl imparting means 3 which impose a swirling motion to the fluid flow about a main flow axis. The expanded and cooled fluid flow may be a two-phase fluid flow. The swirling motion induces the heavier phase of this two-phase fluid flow to swirl towards the outer periphery of the separation chamber 40.

The heavier phase may be liquid droplets in a gaseous or liquid carrier or may be gas bubbles in a liquid carrier. The fluid flow received at the fluid inlet may be a two-phase fluid flow. Alternatively or in addition thereto, the two-phase character of the fluid flow may be the result of the expansion and cooling in the swirl valve.

In accordance with the above, there is provided a method to separate a fluid flow, the method comprises:

receiving a fluid flow in a swirl valve 100, thereby generating a swirling flow, swirling about a central axis 11, separating an inner portion of the swirling flow from an outer portion from the swirling flow in a separation chamber 40, the separation chamber 40 comprising first flow outlet 41 and a second flow outlet 42, arranged to receive the inner portion and the outer portion respectively. The method may further comprise expanding and cooling the swirling flow before separating, thereby generating a new phase at or downstream of the swirl valve 100 by condensation.

Injection Device

Figure 6A:
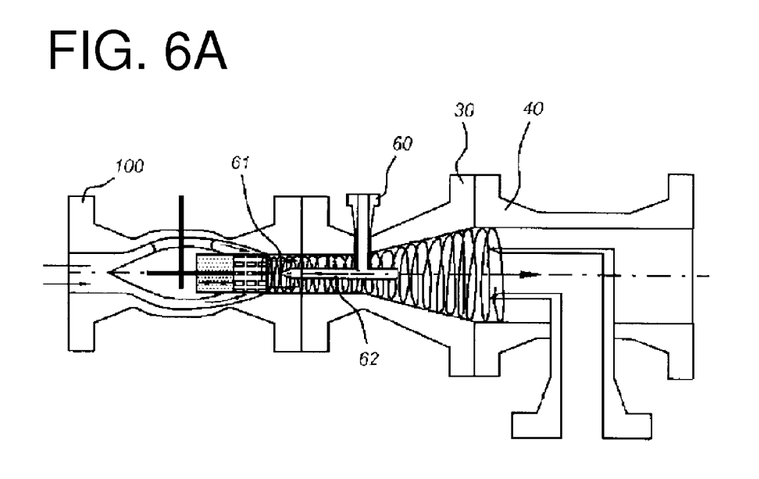
Figure 6B:
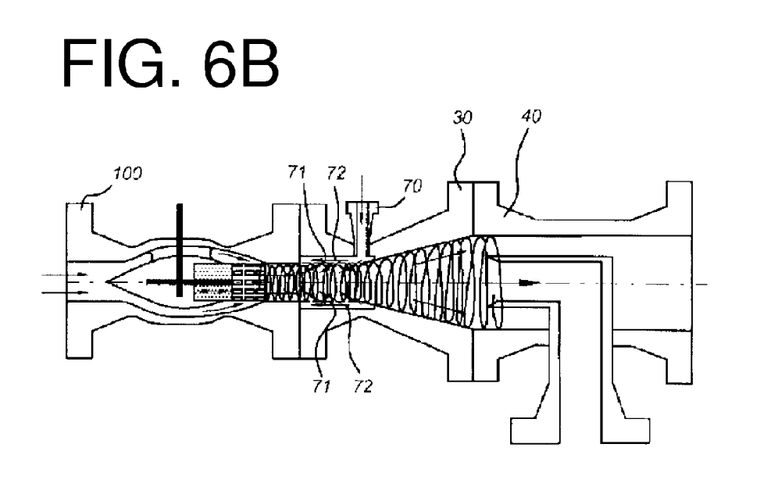

According to a further embodiment, the separation system comprises an injection device 60, 70 comprising an injection outlet 61, 71 positioned to inject a further inlet fluid into the swirling flow. The injection device 60, 70 may be connected to a further inlet fluid supply (not shown) and may be arranged to inject the further inlet fluid in the swirling flow, and may thus be positioned downstream with respect to the swirl valve 100.

The further inlet fluid is selected to selectively remove components from the fluid flow as received by the flow inlet 16. The further inlet fluid may either be a liquid—in case the component(s) to be removed are in the gas phase—or a gas—in case the component(s) to be removed are in the liquid phase. The first process is normally referred to as 'absorption', the second process is referred to as 'stripping'. Two examples of such separation systems comprising injection devices are provided below with reference to FIGS. 6a and 6b.

It will be understood that it is advantageously to create maximal interaction between the swirling flow and the further inlet fluid to maximize the separation efficiency. This can be done by injecting the further inlet fluid as a spray comprising a relatively high particle density. For instance, the injection device 60, 70 may be arranged to create a spray with a particle density of at least about $10^8$/m3. Also, the injection device 60, 70 may be arranged to create spray particles with a size selected from one of a range from about 50 μm to about 0.2 μm, and a range from about 20 μm to about 1 μm. Maximal interaction between the swirling flow and the further inlet fluid may also be achieved by injection of the further inlet fluid in a direction having a substantially component in an upstream direction.

In order to obtain a maximum transfer of components from the swirling flow to the further inlet fluid the following design configurations are presented:

A centrally mounted injection tube 62 for injecting the further inlet fluid being a liquid flow; the injection direction may have a component in radial outward direction and the injection direction may have a component that is in a counter current direction of the first inlet flow introduced via first flow inlet 16 when passing the settling chamber 30; to be used in an absorption process.

A circumferentially mounted injection ring 72 for injection the further inlet fluid being a gas flow; the injection direction may have a component in radial inward direction and the injection direction may have a component that is in a counter current direction of the first inlet flow introduced via first flow inlet 16 when passing the settling chamber 30; to be used in a stripping process.

The first is discussed in more detail below with reference to FIG. 6a, the second with reference to FIG. 6b.

With reference to FIG. 6a, there is provided a further embodiment of a separation system, wherein the injection device 60 comprises an injection tube 62, the injection tube 62 comprising the injection outlet 61, the injection outlet 61 being arranged to inject the further inlet fluid in a direction comprising a radial outward component and an axial upstream component from a position substantially coinciding with the central axis 11.

The injection tube 62 may at least partially coincide with the central axis 11 and may have an injection outlet 61 at its extremity arranged to inject the further inlet fluid. To maximize the interaction between the flow and the further inlet fluid, the injection outlet 61 may further be arranged to inject the further inlet fluid in a (partially) upstream direction.

An advantage of using such a separation system in combination with an injection device 60 is that due to the large rotational motion (swirl), absorption liquids can be atomized in a micron size mist creating an enormous specific contact area for phase transfer, while still this absorption mist can be separated from the gaseous fluid exiting settling chamber 30.

A suitable droplet diameter of the atomized absorption liquid would be <20 micrometer, though preferably <10 micrometer. Suitable absorption liquids may include: Methanol, (Poly)Ethylene Glycol, Alcohols, DMEA, MEA, di-methyl ethers, ethane, propane, etc.

According to an example, the further inlet fluid may comprise at least one constituent for absorbing hydrogen sulphide or carbon dioxides. According to a further example, the further inlet fluid may comprise as constituent at least one of a Sulfolane and an ionic liquid. The ionic liquid may comprise at least one of a 1-butyl-3-methylimidazolium hexafluorophosphate and a 1-hexyl-3-methylimidazolium-bis(trifluoromethylsulfonyl)imide.

With reference to FIG. 6b, there is provided an alternative embodiment of a separation system, wherein the injection device 70 comprises a injection ring 72, mounted circumferential with respect to the central axis I, the injection outlet 71 comprising the injection outlet 71 formed by a plurality of openings, the injection outlet 71 being arranged to inject the further inlet fluid in a direction comprising a radial inward component and an axial upstream component.

The injection ring 72 may be provided in the wall 31 of the settling chamber 30. The openings forming the injection outlet 71 may be provided on the inside of the injection ring 72. Again, to maximize the interaction between the flow and the further inlet fluid, the openings of the injection outlet 71 may further be arranged to inject the further inlet fluid in an upstream direction.

An advantage of such a separation system in combination with such an injection device 70 is that the large rotational motion (swirl) enables micron size bubbles to raise radial inwards through the rotating liquid film. A suitable bubble size of the dispersed stripping gas would be <50 micrometer thought preferably <20 micrometer.

Suitable stripping gases may include: Dew pointed natural gas, nitrogen etc.

The swirl valve as provided in the embodiments above, allows reducing the size of a separator train that is required downstream of the swirl valve to obtain sufficient separation. This allows for improved processing systems.

So there is provided a method as described above, comprising:
injecting a further inlet fluid into the swirling flow before separating.

Processing Systems

The above embodiments can be used in process systems, examples of which are provided in FIGS. 7a-8b and which are discussed in more detail below.

In general there is provided a processing system comprising at least one separation system SS1, SS2 according to the embodiments described above.

Gas Processing Systems

Figure 7A:
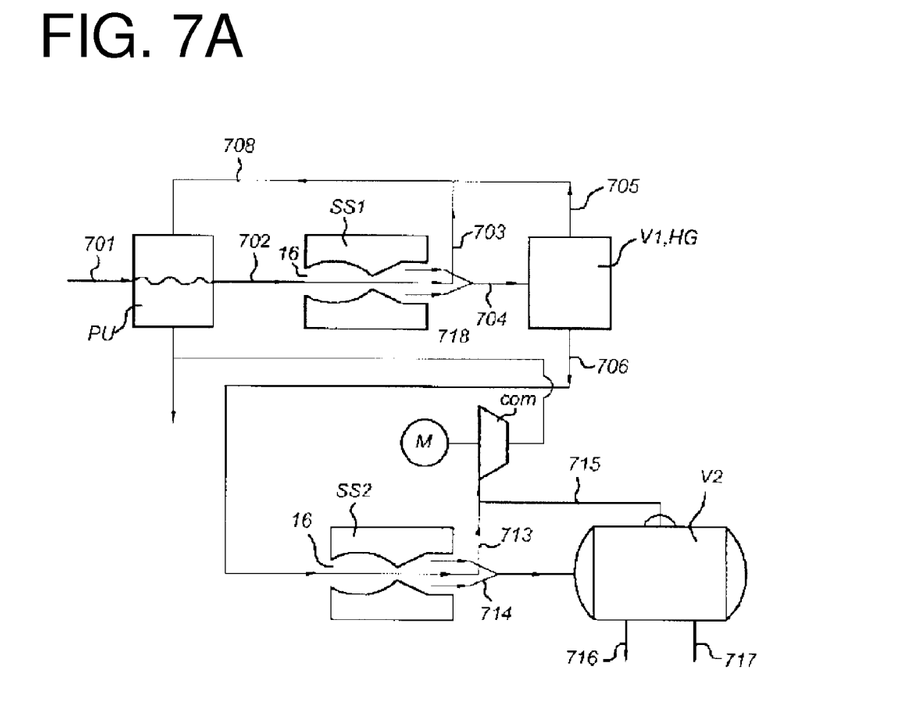
Figure 7B:
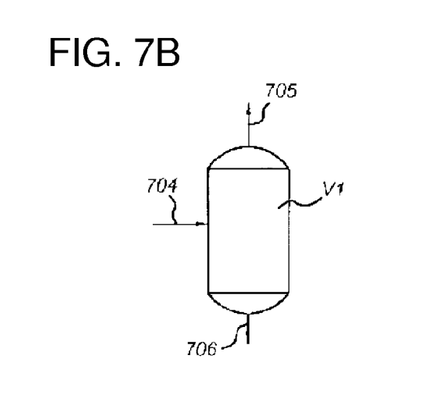
Figure 7C:
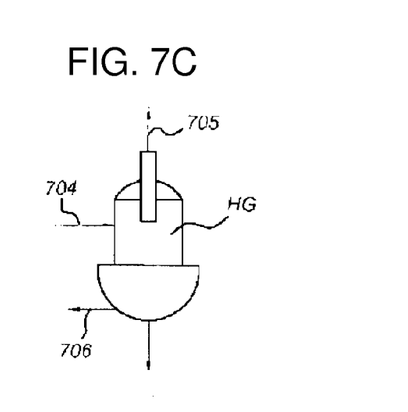

According to FIGS. 7a-7c there is provided a processing system comprising:
a pre-cooling unit PU arranged to receive a gas flow 701 and produce a pre-cooled gas flow 702,
a first separation system SS1 arranged to receive the pre-cooled gas flow 702 from the pre-cooling unit PU and to produce a first output flow 703 via the first flow outlet 41 and a second output flow 704 via the second flow outlet 42,
a first separator vessel V1, HG arranged to receive the second output flow 704 and to produce a top flow 705 and a bottom flow 706,
a second separation system SS2 arranged to receive the bottom flow 706 of the first separator vessel V1, HG and to produce a further first output flow 713 via a further first flow outlet 41 and a further output flow 714 via a further second flow outlet 42.

FIG. 7a will now be described in more detail.

FIG. 7a shows a processing scheme wherein a high pressure natural gas flow 701 is received, which is pre-cooled in a pre-cooling unit PU. The pre-cooling unit PU may be a multi-stage pre-cooling unit. Of course, many different types of pre-cooling unit PU may be employed.

The pre-cooled gas flow 702 produced by the pre-cooling unit PU is connected to the flow inlet 16 of a first separation system SS1, wherein the separation system SS1 comprises a swirl valve 100, arranged to receive and control the flux of the fluid flow via the flow inlet 16 and to generate a swirling flow, swirling about a flow axis, and further comprising a separation chamber 40 and possibly a settling chamber 30 as described above.

The first output flow 703 via the first flow outlet 41 of the first separation system SS1, which is relatively cold, is fed back to the pre-cooling unit PU to cool the high pressure natural gas flow 701.

The second output flow 704 via the second flow outlet 42 of the first separation system SS1 is connected to a first separator vessel V1, HG.

The first separator vessel V1, HG produces a top flow 705 and a bottom flow 706. The separation process in the first separator vessel V1, HG may be gravitational driven.

The top flow 705 of the first separator vessel V1, HG is also connected to the pre-cooling unit PU to use the relatively cold gas obtained to cool the high pressure natural gas flow 701. The second output flow 704 via the second flow outlet 42 and the top flow 705 of the first separator vessel V1, HG are combined to form a cooling flow 708 for the pre-cooling unit PU.

The bottom flow 706 of the first separator vessel V1, HG, comprising a high pressure condensate, is connected to the flow inlet 16 of a second separation system SS2, wherein the second separation system SS2 comprises a swirl valve, arranged to receive and control the flux of the fluid flow via the flow inlet 16 and to generate a swirling flow, swirling about a flow axis, and further comprising a separation chamber 40 and possibly a settling chamber 30 as described above. The second separation system SS2 produces a further first output flow 713 via a further first flow outlet 41 and a further output flow 714 via a further second flow outlet 42.

With reference to FIGS. 7b and 7c, there is provided an embodiment, wherein the first separator vessel is one of: a liquid-gas separator (V1), a hydrate-gas separator (HG) respectively.

The hydrate-gas separator HG is of a mono-cyclone type as for instance published in EP1461134. The top section of the hydrate-gas separator HG removes the solid hydrates from the gas by inertia and gravitational settling. The settled hydrate solids entering the bottom section in which the hydrate solids are melted using internal heaters. The water evolving from the melting process can be separated from the non miscible hydrocarbon liquids which may also be present in this bottom section of the hydrate-gas separator HG. Due to gravitation, said two immiscible liquids will form a stratified liquid volume of a bottom layer of water, an intermediate layer of hydrates and a top layer of hydrocarbon liquids, in said bottom section of the hydrate-gas separator HG. The water and the hydrocarbon liquids may be separately drained from said bottom section.

According to a further embodiment, the processing system further comprises:
a second separation vessel V2 which may be arranged to receive the further second output flow 714 of the second separation system SS2. The second separation vessel V2 receives the gas depleted hydrocarbon liquids from SS2. The second separation vessel V2 separates the remaining gas fraction from the hydrocarbon liquids. Said gas fraction may be mixed again with gas outflow of SS2 obtained as further first output flow 713 via the further first flow outlet 41.

The further first output flow 713 of the second separation system SS2 is connected to an off gas compressor COM.

A top flow 715 of the second liquid-gas separator vessel V2 is also connected to the off gas compressor COM. The off gas compressor COM, which is driven by an engine M, produces a compressed outflow 718. This compressed outflow 718 is combined with the cooling flow 708 after having passed the pre-cooling unit PU and may comprise dew point natural gas.

Alternatively the remaining gas fraction evolving from second separation vessel V2 as top flow 715 or evolving from the discharge of the compressor 718, may be recycled and re-introduced in the second separation system SS2. In order to do this the second separation system SS2 may comprises a conical central body 15 which is substantially co-axial positioned along the central axis 11 in the swirl valve 100, having a gradually increasing cross-sectional area in an upstream direction. This was explained above with reference to FIG. 5c.

Instead of comprising a sharp extremity pointing in a downstream direction, as shown in FIG. 5c, the conical central body 15 comprises a central outlet (not shown) via which the top 715 may be re-introduced in the second separation system SS2 as central flow.

The further second output flow 714 of the second separation system SS2 may be connected to a second liquid-gas separator vessel V2. Said stream 714 is predominantly liquid though may contain small gas fractions. Also the liquids in 714 may contain both a hydrocarbon mixture as well as an aqueous mixture. The vessel V2 therefore may be designed as a 3 phase separator providing sufficient retention time for the minor gas fraction to rise to the liquid-gas interface where said gas is collected in the top dome of second separation vessel V2 and evacuated via outlet flow 715. Furthermore the second separation vessel V2 may contain internals to enhance the coalescence of the aqueous droplets present in the hydrocarbon liquid. These internals may comprise tilted plates, a porous medium or electrically charged plates. The aqueous liquids will be removed via outlet flow 716 and the hydrocarbon liquids via outlet flow 717.

Liquid Processing Systems

According to FIGS. 8A-8E, there is provided a processing system, wherein the processing system is a liquid processing system, which may be an oil processing system. The processing system comprises:
a separation system SS arranged to receive a high pressure oil flow 802 and to produce a first output flow 803 via the first flow outlet 41 and a second output flow 804 via the second flow outlet 42,
a separation vessel V3, V4 arranged to receive one of the first output flow 803 and the second output flow 804 and arranged to produce a top flow 805, 815 and a bottom flow 806, 816.

The separation system SS may be in accordance with the embodiments described above. The combination of such a separation system SS and a further separation vessel V3, V4 provides an efficient and space-saving processing system. It will be understood that the separation vessels V3 and V4 may also be replaced by traditional inline or compact separators in order to further reduce the volume, weight and containment of the processing system. Such compact separators are disclosed in EP1600215 and WO2008020155.

Figure 8A:
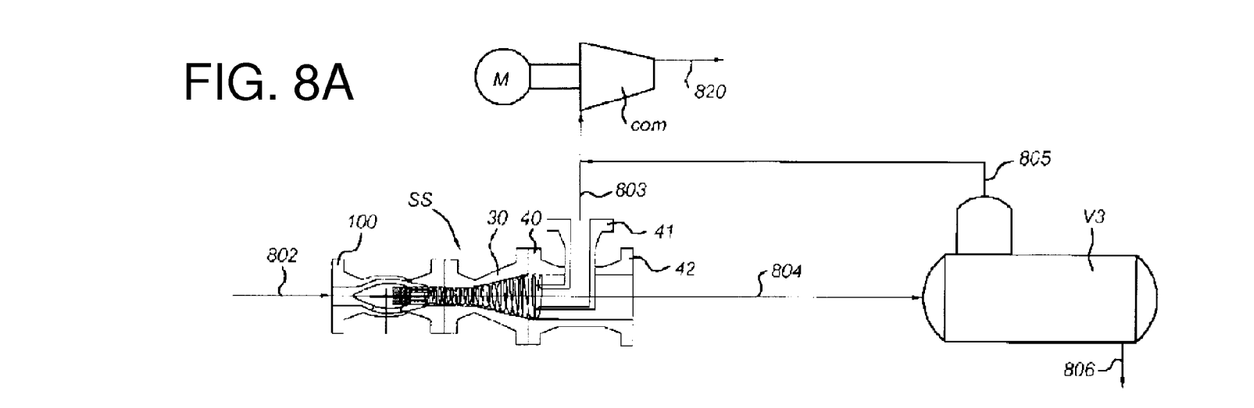

FIG. 8a schematically depicts an embodiment, wherein the separation vessel V3 is arranged to receive the second output flow 804, and the top flow 805 of the separation vessel V3 is combined with the first output flow 803, the processing system further comprising a gas compressor COM arranged to receive the combined first output flow 803 and the top flow 805 of the separation vessel V3.

According to this embodiment, the separation vessel is a gas-liquid separation vessel V3 in which the separation is gravity driven. The bottom flow 806 of this separation vessel V3 is low pressure stabilized oil.

Figure 8B:
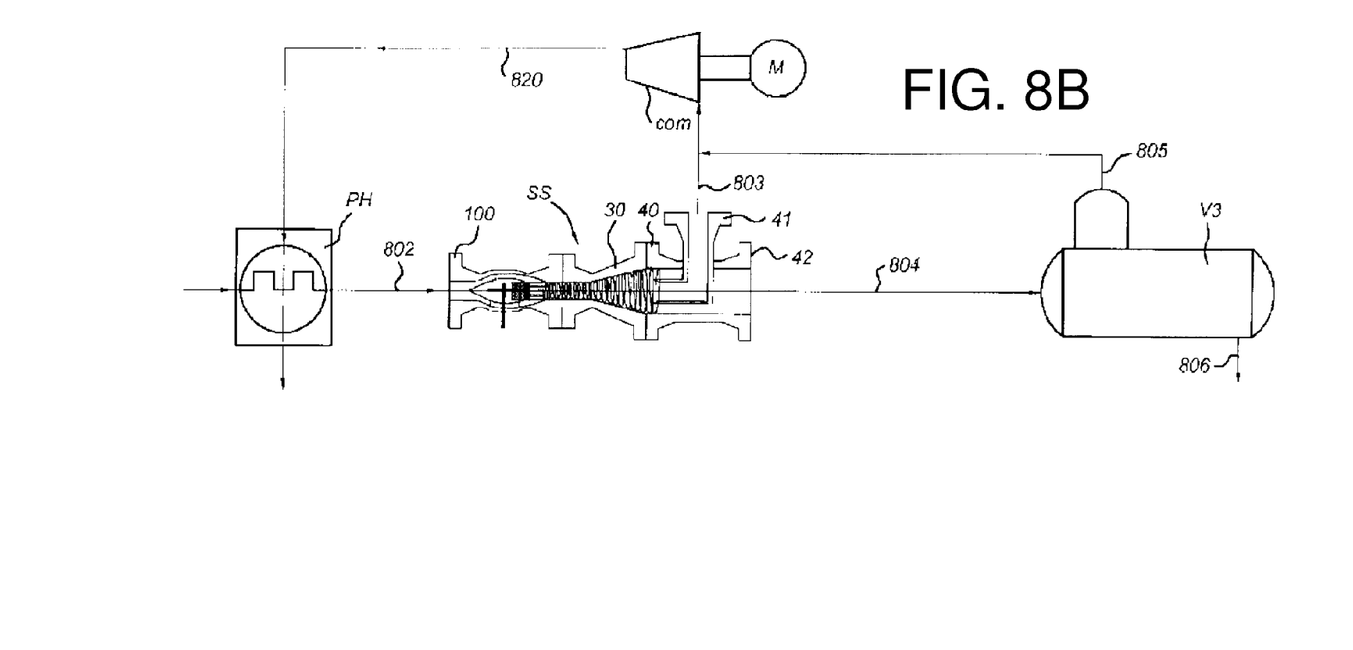
Figures 8C, 8D:
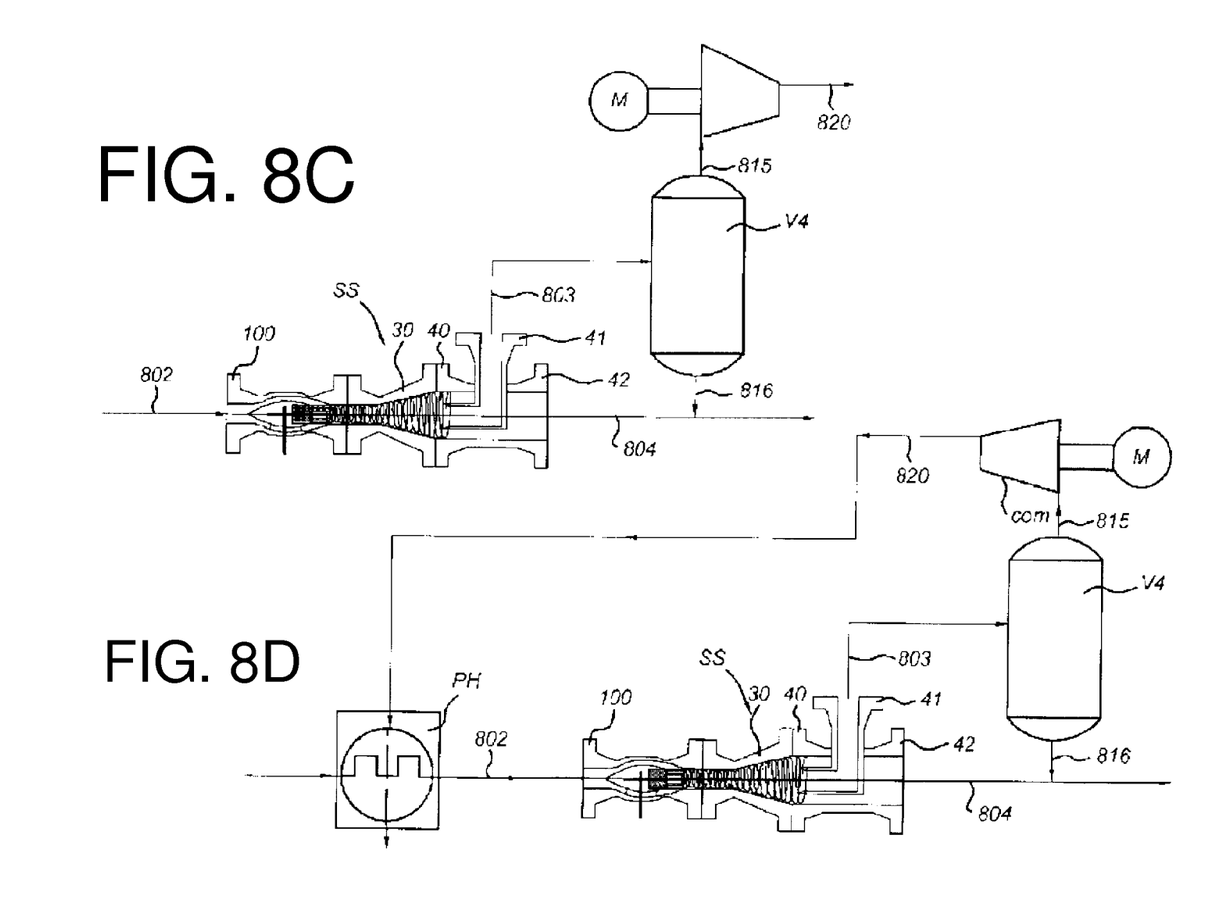
Figure 8E:
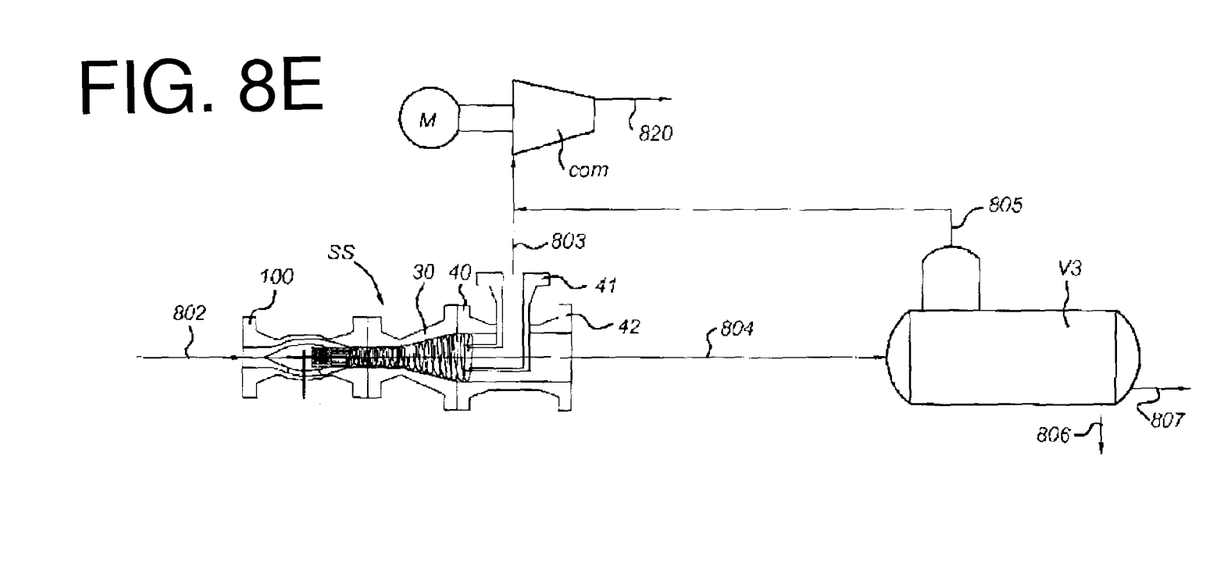

According to a further embodiment shown in FIG. 8e, which is an further embodiment of the processing system shown in FIG. 8a. The high pressure oil flow 802 may comprise water. The water will reach separation vessel V3 via the second output flow 804. The separation vessel V3 is arranged to produce a top flow 805 comprising gas and a bottom flow 806 being an aqueous liquid and a side flow 807 comprising hydrocarbon liquid.

FIG. 8c schematically depicts an embodiment, wherein the separation vessel V4 is arranged to receive the first output flow 803, and the bottom flow 816 of the separation vessel V4 is combined with the second output flow 804, the processing system further comprising a gas compressor COM arranged to receive the top flow 815 of the separation vessel V4.

The compressor COM produces a compressed flow 820, that may be used in an advantageous way, it is to pre-heat the high pressure oil flow 802. So there is provided an embodiment, wherein the processing system further comprises a pre-heater unit PH and the gas compressor COM is arranged to produce a compressed flow 820, which is guided to the pre-heater unit PH to pre-heat the high pressure oil flow 802.

Examples of this are schematically depicted in FIG. 8b, showing an alternative to FIG. 8a, and FIG. 8d, showing an alternative to FIG. 8c.

The horizontal separation vessels V3 are fed by the second flow outlet 804 of the separator system SS which, in use, outputs mainly oil/hydrocarbon liquid, and remove the remaining gas fraction from the oil/hydrocarbon liquid.

These separation vessel V3 may be operated at elevated temperatures typically 10-50° C. above the feed temperature.

The vertical separation vessels V4 are fed by the first flow outlet 803 gas outlet of the separation system SS and removes the remaining liquid phase from the gas before entering the gas compressor COM.

The schemes from FIGS. 8b and 8d deploy a heat exchanger to preheat the feed stream 802 in order to enhance the flash process in the SS. This is especially advantageous for feed streams which produce a relatively large gas stream 803, for example a gas mass flow more than or equal to 10% of the feed mass flow of stream 802.

Processing Methods

In accordance with the embodiments provided above with reference to FIGS. 7a-7c and FIGS. 8a-8e, there is provided a method for processing a fluid, the method comprising:

creating a first output flow 703, 713, 803 via the first flow outlet 41 and a second output flow 704, 714, 804 via the second flow outlet 42 of a separation system SS, SS1, SS2 according to any one of the embodiments provided.

The method may be a gas processing method and comprises:

pre-cooling a gas flow 701 to produce a pre-cooled gas flow 702 in a pre-cooling unit PU, separating the pre-cooled gas flow 702 in a first separation system SS1 to produce the first output flow 703 via the first flow outlet 41 and the second output flow 704 via the second flow outlet 42 separating the second output flow 704 in a first separator vessel V1, HG to produce a top flow 705 and a bottom flow 706, separating the bottom flow 706 in a second separation system SS2 to produce a further first output flow 713 via a further first flow outlet 41 and a further output flow 714 via a further second flow outlet 42. The method may further comprise separating the further second output flow 714 of the second separation system SS2 in a second separation vessel V2. The first separator vessel may be one of a liquid-gas separator V1, a hydrate-gas separator HG.

Further provided is a method, wherein the method is a liquid processing method and the method comprises:

separating an high pressure liquid flow 802 in a separation system SS to produce the first output flow 803 via the first flow outlet 41 and the second output flow 804 via the second flow outlet 42, separating one of the first output flow 803 and the second output flow 804 in a separation vessel V3, V4 to produce a top flow 805, 815 and a bottom flow 806, 816. The separation vessel may be arranged to receive the second output flow 804, and the method further comprises:

combining the top flow 805 of the separation vessel V3 with the first output flow 803 compressing the combined first output flow 803 and the top flow 805 of the separation vessel V3 in a gas compressor COM.

The separation vessel V4 may be arranged to receive the first output flow 803, and the method may further comprise:

combining the bottom flow 816 of the separation vessel V4 with the second output flow 804, compressing the top flow 815 of the separation vessel V4 in a gas compressor COM.

The gas compressor COM may be arranged to produce a compressed flow 820 and the method further comprises:

pre-heating the high pressure oil flow 802 in a pre-heater unit PH by using the compressed flow 820.

Hydrates

The embodiments described above with reference to FIGS. 5a-8d, all relate to the processing of fluids (liquids, gases). These fluids may comprise solid matter as well. For oil and gas processing these solids may for instance include gas hydrates and waxes. Solids are prone to form constrictions and even plugs in pipe lines and equipment, as they can deposit on the internal surface of the equipment.

To avoid deposition of solids, according to the prior art, production chemicals are frequently used. The use of inhibition chemicals and/or heaters may be logistically complex and expensive and may incur a certain amount of risk to field personnel. Above all, results are far from optimal.

According to a further embodiment, a possibility is provided to process the gas without inhibiting chemicals.

For instance to avoid the accumulation of hydrate deposition, the internal surfaces of the apparatus can be coated with an icephobic coating. A suitable icephobic coating would be a fluorinated diamond like carbon (F-DLC). It is required that the surface roughness of said coating (and the underlying surface) is less than 0.05 micrometer in all directions though more preferably less than 0.02 micrometer in all directions. Any coating layer can be suitable as long as the static water contact angle on said surface is more than 90° or more preferably more than 110° while maintaining a difference between the advancing water contact angle and the receding water contact angle on said surface (i.e the hysteresis) of less than 25° but more preferably less than 15°.

All interior surfaces of the different parts of the embodiments provided above may be coated, such as tubes, pipes, valves, especially where cold fluids pass the tubes, or the heat-exchanger PU shown in FIG. 7a.

Further Remarks

Important aspect of the embodiments described above, is that the swirl valve, the separation system comprising such a swirl valve and the processing systems as described above all use the available free pressure in the fluid to create a swirling motion which in terms of angular momentum is an order of magnitude higher than conventional inline cyclonic separators.

A further advantage of the above embodiment is that in turn down mode the ratio of angular momentum/axial momentum slightly increases thereby restoring high separation efficiencies at lowered flow rates, unlike traditional inline cyclone separators where this ratio of angular/axial momentum decreases.

Figure 9:
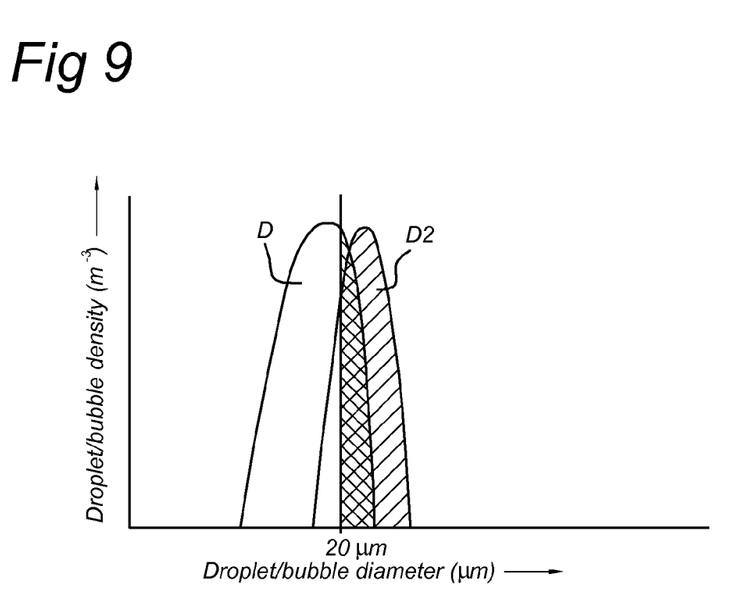
FIG. 9 shows a droplet/bubble density as a function of the droplet/bubble diameter to further explain the embodiments.

The swirl valve creates bigger droplets, increasing the separation efficiency. This is explained in more detail with reference to FIG. 9. FIG. 9 shows a graph showing the droplet/bubble density ($m^{-3}$) as a function of the droplet/bubble diameter (μm). Dispersed mixtures can be characterized by a size distribution (scatter) around a mean diameter resulting in a distribution function (e.g. normal distribution/$0^{th}$ order log normal (ZOLD)/Rosin Rammler etc.).

Since most separators can be characterized by a typical separable diameter (i.e. cut-off diameter), the improvement of the swirl valve in conjunction with a separator, can be illustrated by the following graph. The meaning of the cut-off diameter is that droplets having a diameter that is above the cut-off diameter will be separated. The cut-off diameter may for instance be 20 μm.

The swirl valve increases the mean diameter, thereby increasing the separation efficiency. An example of this is shown in FIG. 9, showing a traditional first distribution D1, for instance representing the distribution of a valve as shown in FIGS. 1a and 1b, and a second distribution D2 representing the distribution of a swirl valve, as shown in FIGS. 2a and 2b. Also, the cut-off diameter of a separator vessel is shown. It can be seen that the separation efficiency of said separator vessel is higher, when the feed stream comprises a dispersed phase with a size distribution D2 since more droplets have a diameter above said cut-off diameter.

The descriptions above are intended to be illustrative, not limiting. Thus, it will be apparent to one skilled in the art that modifications may be made to the invention as described without departing from the scope of the claims set out below.

The invention claimed is:

1. A system comprising a flow inlet (16), wherein a separation system comprises a swirl valve (100), arranged to receive and control the flux of a two-phase fluid flow via the flow inlet (16) and to generate a swirling flow, swirling about a central axis (11),
wherein the separation system further comprises a separation chamber (40) positioned downstream with respect of the swirl valve (100) to receive the swirling flow from the swirl valve (100), wherein the separation chamber (40) comprises a first and second flow outlet (41, 42), wherein the first flow outlet (41) is positioned to receive an inner portion of the swirling flow and the second outlet (42) is positioned to receive an outer portion of the swirling flow, further comprising a settling chamber (30) positioned in between the swirl valve (100) and the separation chamber (40), to receive the swirling flow from the swirl valve (100), the settling chamber (30) being divergent in a downstream direction along the central axis (11) to create a diverged swirling flow, and deliver the diverged swirling flow to the separation chamber (40).

2. A separation system according to claim 1, further comprising a conical central body (15) which is substantially co-axial positioned along the central axis (11) in the swirl valve (100), having a gradually increasing cross-sectional area in an upstream direction.

3. A separation system according to claim 2, wherein a conical central body (15) comprises a central outlet (17) via which a flow can be introduced as central flow.

4. A separation system according to claim 1, wherein the swirl valve (100) is a throttling valve comprising a housing (1), a valve body (2) which is movably arranged in the housing (1) to control a flux of a fluid flow flowing through the fluid inlet (16) such that the fluid flow is expanded and cooled, and a swirl imparter (3) which impose a swirling motion to the fluid flow about a main flow axis.

5. A separation system according to claim 1, wherein the first flow outlet (41) is positioned concentrically within the second flow outlet (42) with respect to the central axis (11).

6. A separation system according to claim 1, wherein the separation system comprises an injection device (60, 70) comprising an injection outlet (61, 71) positioned to inject a further inlet fluid into the swirling flow.

7. A separation system according to claim 6, wherein the injection device (60) comprises an injection tube (62), the injection tube (62) comprising the injection outlet (61), the injection outlet (61) being arranged to inject the further inlet fluid in a direction comprising a radial outward component and an axial upstream component from a position substantially coinciding with the central axis (11).

8. A separation system according to claim 7, wherein the injection device (70) comprises a circumferentially mounted injection ring (72), the injection outlet (71) being arranged to inject an injection flow in a direction comprising a radial inward component and an axial upstream component.

9. The processing system, for processing a fluid, the processing system comprising at least one separation system (SS, SS 1, SS2) according to claim 1.

10. The processing system according to claim 9, wherein the processing system is a gas processing system and comprises:
a pre-cooling unit (PU) arranged to receive a gas flow (701) and produce a pre-cooled gas flow (702),
a first separation system (SS I) arranged to receive the pre-cooled gas flow (702) from the pre-cooling unit (PU) and to produce a first output flow (703) via the first flow outlet (41) and a second output flow (704) via the second flow outlet (42),
a first separator vessel (VI, HG) arranged to receive the second output flow (704) and to produce a top flow (705) and a bottom flow (706),
a second separation system (SS2) arranged to receive the bottom flow (706) of the first separator vessel (VI, HG) and to produce a further first output flow (713) via a further first flow outlet (41) and a further output flow (714) via a further second flow outlet (42).

11. The processing system according to claim 10, wherein the processing system further comprises:
a second separation vessel (V2) arranged to receive a further second output flow (714) of the second separation system (SS2).

12. The processing system according to claim 1, wherein a first separator vessel is one of: a liquid-gas separator (Vi), a hydrate-gas separator (HG).

13. The processing system according to claim 9, wherein the processing system is an oil processing scheme, the processing system comprises:
a separation system (SS) arranged to receive a high pressure oil flow (802) and to produce a first output flow (803) via the first flow outlet (41) and a second output flow (804) via the second flow outlet (42),
a separation vessel (V3, V4) arranged to receive one of the first output flow (803) and the second output flow (804) and arranged to produce a top flow (805, 815) and a bottom flow (806, 816).

14. The processing system according to claim 13, wherein the separation vessel (V3) is arranged to receive the second output flow (804), and the top flow (805) of the separation vessel (V3) is combined with the first output flow (803), the processing system further comprising a gas compressor (COM) arranged to receive a combined first output flow (803) and the top flow (805) of the separation vessel (V3).

15. The processing system according to claim 14, wherein the separation vessel (V4) is arranged to receive the first output flow (803), and the bottom flow (816) of the separation vessel (V4) is combined with the second output flow (804), the processing system further comprising a gas compressor (COM) arranged to receive the top flow (815) of the separation vessel (V4).

16. The processing system according to claim 14, wherein the processing system further comprises a pre-heater unit (PH) and the gas compressor (COM) is arranged to produce a compressed flow (820), which is guided to the pre-heater unit (PH) to pre-heat the high pressure oil flow (802).

17. The processing system according to claim 13, wherein the separation vessel (V3) is further arranged to produce a side flow (807), the bottom flow substantially being an aqueous liquid and the side flow substantially being a hydrocarbon liquid.

18. A method to separate a fluid flow, the method comprises:
- receiving a two-phase fluid flow in a swirl valve (100), thereby generating a swirling flow, swirling about a central axis (11),
- receiving the swirling flow from the swirl valve (100) in a settling chamber (30) positioned in between the swirl valve (100) and a separation chamber (40), the settling chamber (30) being divergent in a downstream direction along the central axis (11) to create a diverged swirling flow, and deliver the diverged swirling flow to the separation chamber (40),
- separating an inner portion of the swirling flow from an outer portion from the swirling flow in a separation chamber (40), the separation chamber (40) comprising first flow outlet (41) and a second flow outlet (42), arranged to receive the inner portion and the outer portion respectively.

19. The method according to claim 18, wherein the method further comprises:
- expanding and cooling the swirling flow before separating, thereby generating a new phase at or downstream of the swirl valve (100) by condensation.

20. The method according to claim 18, wherein the method further comprises: injecting a further inlet fluid into the swirling flow before separating.

21. The method for processing a fluid, the method comprising:
- creating a first output flow (703, 713, 803) via the first flow outlet (41) and a second output flow (704, 714, 804,) via the second flow outlet (42) of a separation system (SS, SS 1, SS2) according to claim 19.

22. The method according to claim 21, wherein the method is a gas processing method and comprises:
- pre-cooling a gas flow (701) to produce a pre-cooled gas flow (702) in a pre-cooling unit (PU),
- separating the pre-cooled gas flow (702) in a first separation system (SS 1) to produce the first output flow (703) via the first flow outlet (41) and the second output flow (704) via the second flow outlet (42),
- separating the second output flow (704) in a first separator vessel (V 1, HG) to produce a top flow (705) and a bottom flow (706),
- separating the bottom flow (706) in a second separation system (SS2) to produce a further first output flow (713) via a further first flow outlet (41) and a further output flow (714) via a further second flow outlet (42).

23. The method according to claim 22, wherein the method further comprises:
- separating a further second output flow (714) of the second separation system (SS2) in a second separation vessel (V2).

24. The method according to claim 21, wherein the method is a liquid processing method, the method comprises:
- separating an high pressure liquid flow (802) in a separation system (SS) to produce a first output flow (803) via the first flow outlet (41) and a second output flow (804) via the second flow outlet (42),
- separating one of the first output flow (803) and the second output flow (804) in a separation vessel (V3, V4) to produce a top flow (805, 815) and a bottom flow (806, 816).

25. The method according to claim 24, wherein the separation vessel (V3) is arranged to receive the second output flow (804), and the method further comprises:
- combining the top flow (805) of the separation vessel (V3) with the first output flow (803),
- compressing the combined first output flow (803) and the top flow (805) of the separation vessel (V3) in a gas compressor (COM).

26. The method according to claim 25, wherein the separation vessel (V4) is arranged to receive the first output flow (803), and the method further comprises:
- combining the bottom flow (816) of the separation vessel (V4) with the second output flow (804),
- compressing the top flow (815) of the separation vessel (V4) in a gas compressor (COM).

27. The method according to claim 25, wherein the gas compressor (COM) is arranged to produce a compressed flow (820) and the method further comprises:
- pre-heating a high pressure oil flow (802) in a pre-heater unit (PH) by using the compressed flow (820).

* * * * *